(12) United States Patent
Hulyalkar et al.

(10) Patent No.: US 9,161,023 B2
(45) Date of Patent: *Oct. 13, 2015

(54) METHOD AND SYSTEM FOR RESPONSE TIME COMPENSATION FOR 3D VIDEO PROCESSING

(71) Applicants: Broadcom Corporation, Irvine, CA (US); Irina Klebanov, Thornhill (CA)

(72) Inventors: Samir Hulyalkar, Newtown, PA (US); Xuemin Chen, Rancho Santa Fe, CA (US); Marcus Kellerman, San Diego, CA (US); Ilya Klebanov, Ontario (CA); Sunkwang Hong, Yardley, PA (US)

(73) Assignee: BROADCOM CORPORATION, Irvine, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/662,924

(22) Filed: Oct. 29, 2012

(65) Prior Publication Data

US 2013/0050423 A1 Feb. 28, 2013

Related U.S. Application Data

(63) Continuation of application No. 12/605,039, filed on Oct. 23, 2009, now Pat. No. 8,300,087.

(51) Int. Cl.
*H04N 13/04* (2006.01)
*H04N 13/02* (2006.01)
*H04N 21/61* (2011.01)

(52) U.S. Cl.
CPC ....... *H04N 13/0438* (2013.01); *H04N 13/0275* (2013.01); *H04N 13/04* (2013.01); *H04N 21/6125* (2013.01)

(58) Field of Classification Search
CPC .......... H04N 13/0429; H04N 13/0275; H04N 21/6125; H04N 13/0059; H04N 13/04
See application file for complete search history.

(56) References Cited

U.S. PATENT DOCUMENTS

| | | | |
|---|---|---|---|
| 6,317,166 B1* | 11/2001 | McCutchen | 348/722 |
| 2001/0043266 A1* | 11/2001 | Robinson et al. | 348/53 |
| 2002/0105483 A1* | 8/2002 | Yamazaki et al. | 345/7 |
| 2007/0023672 A1* | 2/2007 | Sellmair | 250/396 R |
| 2007/0263003 A1* | 11/2007 | Ko et al. | 345/502 |
| 2010/0231496 A1 | 9/2010 | Yu et al. | |
| 2011/0261050 A1* | 10/2011 | Smolic et al. | 345/419 |

OTHER PUBLICATIONS

LCD shutter glasses, Wikipedia, the free encyclopedia, Oct. 1, 2009, http://en.wikipedia.org/wiki/LCD_shutter_glasses.

* cited by examiner

*Primary Examiner* — Djenane Bayard
(74) *Attorney, Agent, or Firm* — Foley & Lardner LLP

(57) ABSTRACT

An interleaved multi-view video stream is received. The interleaved multi-view video stream includes one or more first view frames, one or more second view frames, and blanking frames in a sequential pattern. The blanking frames separate the first view frames from the second view frames in the sequential pattern. The interleaved multi-view video stream is displayed in the sequential pattern. In one embodiment, the blanking frames are detected, and operation of a viewing device is synchronized based at least in part on the blanking frames being detected.

20 Claims, 9 Drawing Sheets

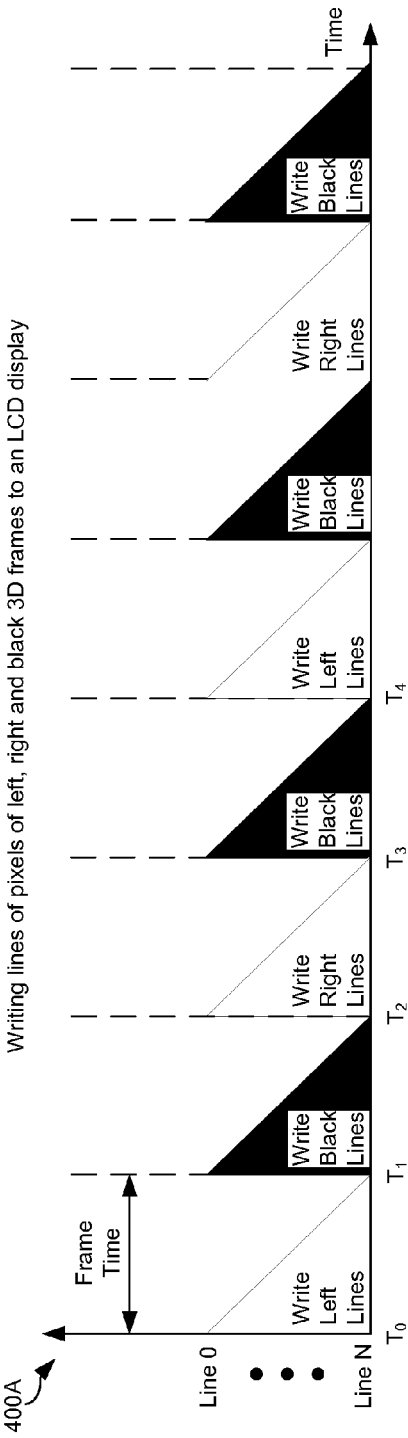
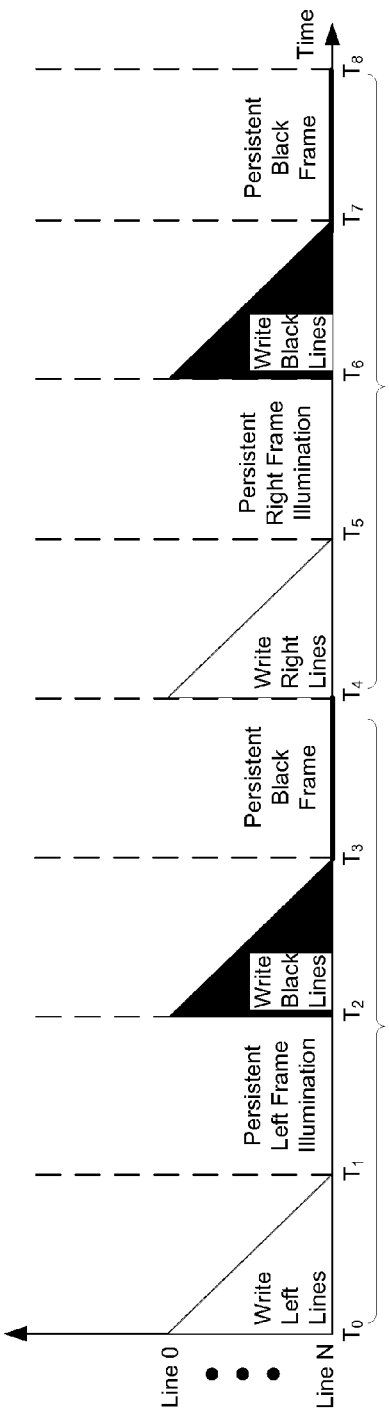
FIG. 4A
FIG. 4B

METHOD AND SYSTEM FOR RESPONSE TIME COMPENSATION FOR 3D VIDEO PROCESSING

CROSS-REFERENCE TO RELATED APPLICATIONS/INCORPORATION BY REFERENCE

This application is a continuation of, and claims priority to, co-pending U.S. Patent Application entitled "Method and System for Response Time Compensation for 3D Video Processing" filed on Oct. 23, 2009 and assigned application Ser. No. 12/605,039, which is incorporated herein by reference in its entirety.

This application also makes reference to:
U.S. patent application Ser. No. 12/554,416, which was filed on Sep. 4, 2009;
U.S. patent application Ser. No. 12/546,644, which was filed on Aug. 24, 2009;
U.S. patent application Ser. No. 12/578,048, which was filed on Oct. 13, 2009,
U.S. Provisional Patent Application Ser. No. 61/242,644, which was filed on Sep. 15, 2009;
U.S. patent application Ser. No. 12/545,679, which was filed on Aug. 21, 2009;
U.S. patent application Ser. No. 12/560,554, which was filed on Sep. 16, 2009;
U.S. patent application Ser. No. 12/560,578, which was filed on Sep. 16, 2009;
U.S. patent application Ser. No. 12/560,592, which was filed on Sep. 16, 2009;
U.S. patent application Ser. No. 12/604,936, which was filed on Oct. 23, 2009,
U.S. patent application Ser. No. 12/573,746, which was filed on Oct. 5, 2009; and
U.S. patent application Ser. No. 12/573,771, which was filed on Oct. 5, 2009.

Each of the above stated applications is hereby incorporated herein by reference in its entirety.

FIELD OF THE INVENTION

Certain embodiments of the invention relate to communication systems. More specifically, certain embodiments of the invention relate to response time compensation for 3D video processing.

BACKGROUND OF THE INVENTION

Digital video capabilities may be incorporated into a wide range of devices such as, for example, digital televisions, digital direct broadcast systems, digital recording devices, gaming consoles and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV, a 3D video is often desirable because it is often more realistic to viewers than the 2D counterpart. A 3D video comprises a left view video and a right view video. A 3D video frame may be produced by combining left view video components and right view video components.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for response time compensation for 3D video processing.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4A is a block diagram that illustrates an exemplary sequence of 3D frames in a left, black, right, black pattern, which may be utilized in connection with an embodiment of the invention.

FIG. 4B is a block diagram that illustrates an exemplary sequence of 3D frames comprising persistent pixel illumination, in a left, left, black, black, right, right, black, black pattern, in accordance with an embodiment of the invention.

DETAILED DESCRIPTION OF THE INVENTION

Figure 1:
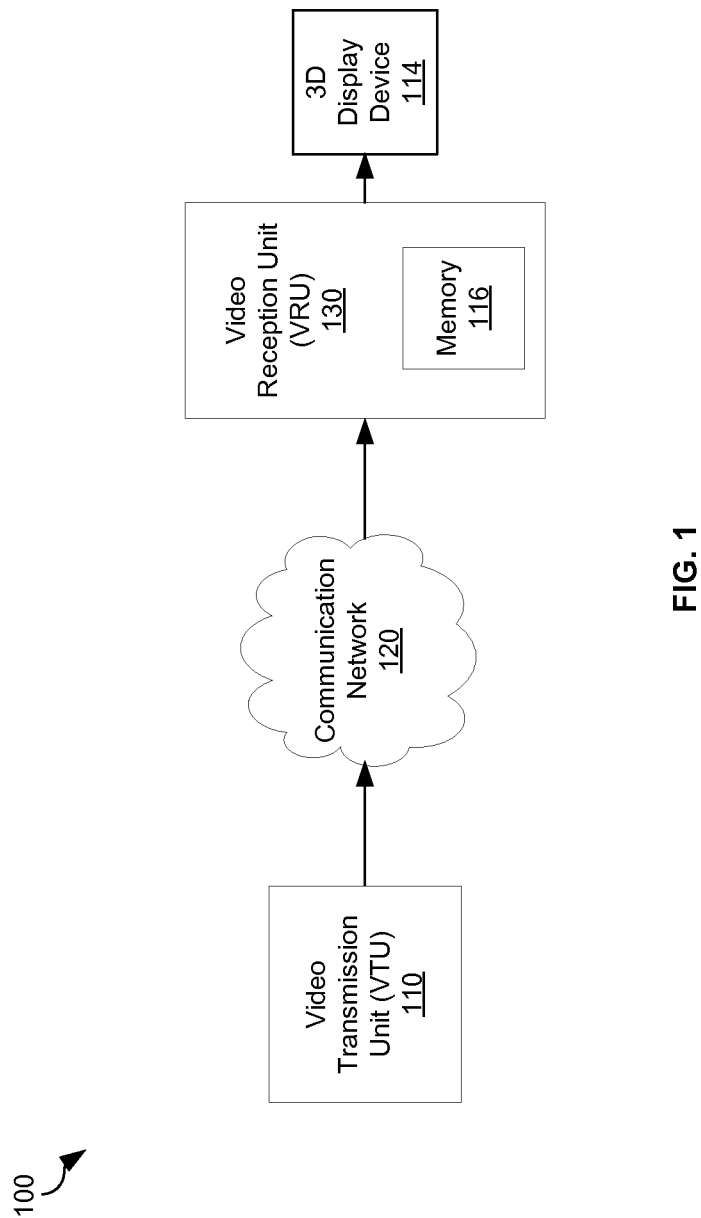
FIG. 1 is a block diagram of an exemplary 3D video and/or 3D graphics communication system, in accordance with an embodiment of the invention.

Certain embodiments of the invention can be found in a method and system for response time compensation for 3D video processing. In accordance with various embodiments of the invention, one or more processors and/or circuits in a 3D video and/or graphics processing device may generate formatted left view 3D video and/or graphics frames, right view 3D video and/or graphics frames and black frames in a specified sequential pattern. The specified sequential pattern may comprise at least two of the black frames that are inserted between the at least one left view 3D video and/or graphics frames and the at least one right view 3D video and/or graphics frames. The formatted left view 3D video and/or graphics frames, the right view 3D video and/or graphics frames and the at least two contiguous black frames may be displayed in order according to the specified sequential pattern, for example, on an LCD display device.

The specified sequential pattern may comprise two or three contiguous left frames followed by at least two contiguous black frames followed by two or three contiguous right frames followed by at least two contiguous black frames. One or more of the at least one left view 3D video and/or graphics frames may comprise one or more interpolated left view 3D video and/or graphics frames. Also, the at least one right view 3D video and/or graphics frames may comprise one or more interpolated right view 3D video and/or graphics frames. The at least one left view 3D video and/or graphics frames and the at least one right view 3D video and/or graphics frames may be displayed in an order that is ascending or that may comprise ascending and/or repeated left and right frames. Moreover, the at least two contiguous black frames of the specified sequential pattern may be displayed for a duration that exceeds liquid crystal display response time. A viewer's 3D shutter glasses may be synchronized with the specified sequential pattern based on the two or more contiguous black frames within the specified sequential pattern. For example, the 3D shutter glasses may be operable to adaptively synchronize with the specified sequential pattern. A left lens of a viewer's 3D shutter glasses may allow light to pass through to a left eye within an interval of display of the at least one left view 3D video and/or graphics frames followed by the at least two black frames and prior to display of the at least one right view 3D video and/or graphics frames. The right lens of the 3D shutter glasses may block light during the interval that transmission of light occurs in the left lens. Similarly, a right lens of the 3D shutter glasses may allow light to pass through to a right eye within an interval of display of the at least one right view 3D video and/or graphics frames followed by the at least two black frames and prior to display of the at least one left view 3D video and/or graphics frames. The left lens of the 3D shutter glasses may block light during the interval that transmission of light occurs in the right lens. The specified sequential pattern comprising content from a pair of left and right 3D 24 Hz frames may be displayed on a 240 Hz display device. Additionally, the specified sequential pattern comprising content from two pairs of left and right 3D 60 Hz frames may be displayed on a 240 Hz display device. In this manner, crosstalk comprising left and right 3D content may be mitigated.

FIG. 1 is a block diagram of an exemplary 3D video and/or 3D graphics communication system, in accordance with an embodiment of the invention. Referring to FIG. 1, there is shown a video transmission unit (VTU) 110, a communication network 120, a video reception unit (VRU) 130, a memory 116 and a 3D display device 114.

The VTU 110 may comprise suitable logic, circuitry, interfaces and/or code that may be operable to provide coded video content to the VRU 130. The VTU 110 may be operable to encode 3D video. For example, the VTU 110 may be operable to encode the 3D video as a left view video stream and a right view video stream which may be referred to as the left video stream and/or the right video steam. The left video stream and/or the right video stream may be transmitted via different channels to the VRU 130. In addition, a stream of left view 3D graphics information and/or a stream of right view 3D graphics information may be transmitted via different channels to the VRU 130. The left view 3D graphics information stream and the right view 3D graphics information stream may be referred to as the left graphics stream and the right graphics stream. Examples of the VTU 110 may comprise a cable television head-end, a direct broadcast satellite head-end and a web server.

The communication network 120 may comprise suitable logic, circuitry, interfaces and/or code that may be operable to provide platforms for communication between the VTU 110 and the VRU 130. The communication network 120 may be implemented as a wired or wireless communication network. The communication network 120 may be a local area network, a wide area network, the Internet, and the like.

The VRU 130 may comprise suitable logic, circuitry, interfaces and/or code that may be operable to receive a transport stream from the VTU 110 over the communication network 120. The received transport stream may comprise coded left and/or right 3D video streams, for example, video streams comprising one or more 3D TV programs and/or may comprise left and/or right 3D graphics information streams, for example. The left and/or right 3D graphics information may comprise left and/or right 3D graphics primitives, for example. In this regard, the VRU 130 may be operable to de-multiplex or parse the left and/or right video streams and/or the left and/or right 3D graphics information streams from the received transport stream. The VRU 130 may extract and/or may store in the memory 116 of the VRU 130, the left and/or right video stream data and/or the left and/or right 3D graphics information, for example. In various embodiments of the invention, left and/or right 3D graphics information may not be received from the VTU 100. For example, left and/or right 3D graphics information may be stored in the VRU 130. The left and/or right 3D graphics information may correspond to left and/or right video content or may be independent of the video content. In various embodiments of the invention, the left and/or right 3D graphics information may be selected based on user input. The VRU 130 may be operable to decode the extracted left and/or right 3D video stream data. The VRU 130 may be operable to generate left and/or right 3D graphics based on the left and/or right 3D graphics information. The left and or right 3D graphics information may comprise left and/or right view graphics primitives that may be rendered by the VRU 130 to generate left view and/or right view 3D graphics, for example. The left and/or right view 3D graphics may comprise left and/or right view 3D pixel data and/or left and/or right view 3D graphics frames. The left and/or right view 3D graphics information, 3D graphics, 3D pixels and/or 3D frames may be referred to as left and/or right graphics information, graphics, pixels and/or frames. An exemplary VRU 130 may comprise a set-top box and/or a television set and/or a personal computer.

The 3D display device 114 may be operable to display left and right view 3D graphics and/or 3D video frames sequentially in time and/or as single frames comprising interleaved left and right view pixels where the left and right view pixels are polarized at different angles or in different directions.

The 3D display device 114 may be operable to display time sequential left view and right view 3D video and/or graphics frames. In instances when the 3D display device 114 is operable to display time sequential left and/or right views, a viewer may need to wear 3D shutter glasses. The 3D shutter glasses may be utilized when viewing a 3D video and/or graphics via a display screen to create the illusion of a three dimensional image. In an exemplary pair of 3D shutter glasses, a glass corresponding to one eye may block light from reaching the eye while a glass corresponding to the other eye may enable transmission of light. For example, when voltage is applied to a LCD shutter glass, it may darken to block light. The 3D display device 114 may be operable to synchronize with the 3D shutter glasses, for example, based on the two contiguous black frames in the sequential pattern. For example, the 3D display device 114 may be operable to adaptively synchronize with the 3D shutter glasses. In various embodiments of the invention, the 3D display 114 and the 3D shutter glasses may communicate via a Bluetooth connection. In other various embodiments of the invention, the glasses may be controlled by an IR emitter that may send IR signals from the 3D display device. The glasses may be operable to darken over one eye at a time and then darken over the other eye in synchronization with a refresh rate of the display screen.

In various embodiments of the invention, the VRU 130 and the display device 114 may be integrated into a single unit or single module, for example, a television set. In other embodiments of the dimension, the VRU 130 and the 3D display device 114 may comprise separate units and/or modules. For example, the VRU 130 may comprise a set-top-box and the 3D video display device 114 may comprise a 3D capable television or 3D video display panel. Moreover, the invention is not limited with regard to which unit performs a particular function. For example, video and graphics may be blended in the VRU 130 and/or in the 3D display device 114.

The VRU 130 and/or the 3D display device 114 may be operable to blend the left video data with the left 3D graphics data and may blend the right video data with the right 3D graphics data. The 3D display device 114 may be operable to display the left and/or right view 3D video and/or graphics based on time sequential left and right frames. An exemplary 3D display device 114 may comprise, for example, a 3D television or a computer monitor.

The VRU 130 and/or the 3D display device 114 may comprise suitable logic, circuitry, interfaces and/or code that may be operable to format the 3D left and/or right video and/or graphics frames, for example, the blended left 3D video and graphics and/or the blended right 3D video and graphics frames to be displayed in a specified pattern. In this regard, the left and/or right 3D video and/or graphics frames may be displayed with other inserted frames in a specified sequential order. The other inserted frames may comprise, for example, black frames or frames of various luminance and/or chrominance. In this regard, the other inserted frames may be referred to as blanking frames and/or as black frames. Moreover, the left 3D video and/or graphics frames may be referred to as left frames and the right 3D video and/or graphics frames may be referred to as right frames.

In various embodiments of the invention, the 3D display device 114 may comprise a persistent display, such as for example, an LCD display. A frame of left and/or right 3D video and/or graphics content may be written to the 3D display device 114 in lines of pixels and the lines of pixels may be illuminated with the written content until another value is written over it. In instances when a screen may be partially illuminated with a left 3D video and/or graphics frames and partially illuminated with a right 3D video and/or graphics frame, a viewer may perceive crosstalk. In this regard, a specified pattern of left and/or right 3D video and/or graphics frames and blanking frames may reduce crosstalk and/or improve quality in a 3D video and/or graphics viewing experience. Moreover, the inserted blanking frames may enable 3D shutter glasses to sync with a sequential display pattern of the left and/or right 3D video and/or graphics frames. The 3D shutter glasses may be adaptively synchronized with the sequential display pattern in various embodiments of the invention. A plurality of blanking frames may be inserted between the left and right 3D video and/or graphics frames. In this manner, crosstalk may be mitigated where a liquid crystal response time may be of a similar order as a display refresh rate.

In operation, the VTU 110 may be operable to encode left and/or right view 3D video and/or graphics information. For example, a 3D TV program may be encoded into a left view 3D video stream and/or a right view 3D video stream. Similarly, graphics information may be encoded, for example, 3D graphics information may be encoded into left and/or right 3D graphics information streams or into a 2D graphics information steam. In this regard, a multiplexed transport stream comprising a plurality of encoded 3D video and/or graphics streams may be communicated to the VRU 130 over the communication network 120. The VRU 130 may be operable to receive and/or de-multiplex the transport stream and may be operable to extract the encoded streams, for example, the left and/or right 3D video and/or the graphics information streams. The VRU 130 may be operable to decode the coded left and/or right 3D video streams and the graphics information streams. The VRU 130 may be operable to process the received graphics information to generate graphics frames that may comprise left and/or right 3D graphics frames and/or 2D graphics frames, for example. Alternatively, graphics information, for example, left and/or right 3D graphics information or 2D graphics information, may be stored for use as needed, within the VRU 130. In this regard, the VRU 130 may utilize the stored graphics information to generate the graphics frames. In various embodiments of the invention, the left and/or right 3D video frames may be blended and/or spliced with the generated graphics frames and/or may be noise reduced by the VRU 130 and/or the 3D display device 114. The resulting left and/or right 3D video and/or graphics frames and a plurality of blanking frames may be formatted for display in a specified pattern by the 3D display device 114.

Figure 2:
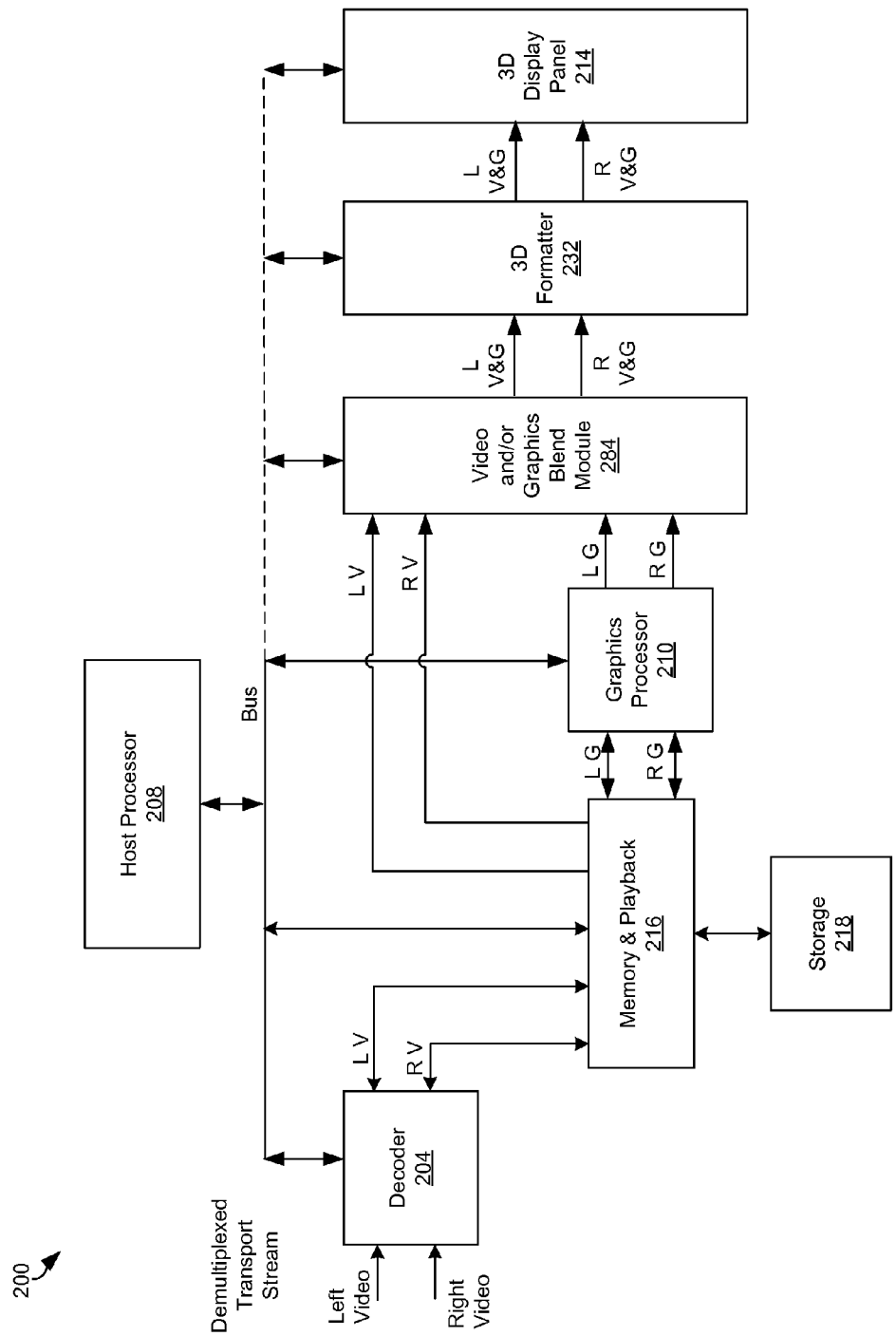
FIG. 2 is a block diagram that illustrates exemplary 3D video reception and/or display subsystems that may be operable to format left and/or right view 3D video and/or graphics frames and/or blanking frames, in accordance with an embodiment of the invention.

FIG. 2 is a block diagram that illustrates exemplary 3D video reception and/or display subsystems that may be operable to format left and/or right view 3D video and/or graphics frames and/or blanking frames, in accordance with an embodiment of the invention. Referring to FIG. 2, there is shown a 3D video processing system 200 comprising a host processor 208, a decoder 204, a memory and playback module 216, a local storage 218, a graphics processor 210, a 3D video and/or graphics blend module 284, a 3D formatter 232 and a 3D display device 214.

The 3D video processing system 200 may comprise one unit, for example, a television or laptop or may comprise a plurality of units. For example, the plurality of units may comprise a set-top-box and a display device or television or may comprise a computer and a display device. In this regard, video processing subsystems of the 3D video processing system 200, for example, the host processor 208, the decoder 204, the memory and playback module 216, the local storage 218, the graphics processor 210, the video and/or graphics blend module 284, the 3D formatter 232 and the 3D display device 214 may be integrated into a single unit or may be distributed among a plurality of units. FIG. 1 illustrates an exemplary embodiment in where the VRU 130 and the 3D display device 114 are distinct units.

The host processor 208 may comprise suitable logic, circuitry, interfaces and/or code that may be operable to control operations of various subsystems within the 3D video processing system 200, for example, one or more of the decoder 204, the graphics processor 210, the memory and playback module 216, the local storage 218, the 3D video and/or graphics blend module 284, the 3D formatter 232 and/or the 3D display device 214. In this regard, the host processor 208 may be operable to execute programming instructions and/or to communicate configuration parameters to one or more of the subsystems within the 3D video processing system 200. The host processor 208 may support various applications, for example, 2D graphics generation and/or left and/or right view 3D graphics generation, 3D video decoding, 3D video and/or graphics blending and/or 3D formatting, for example. For example, the host processor 208 may be operable to configure and/or control the 3D formatter to interleave left and/or right 3D video and/or graphics frames with blanking frames. The left 3D video and/or graphics frames may be referred to as left frames and the right 3D video and/or graphics frames may be referred to as right frames. The host processor 208 may be operable to communicate with the memory and playback module 216 and/or the local storage 218 to read and/or write the left and/or right 3D video and/or graphics data.

The decoder 204 may comprise suitable logic, circuitry, interfaces and/or code that may be operable to decode, frame by frame, the left and/or right view video streams received from the VTU 110. The decoder 204 may be operable to utilize various video decompression algorithms such as specified in MPEG-2, MPEG-4, AVC, VC1, VP6, H.264 and/or other video formats to form decompressed or decoded video content for the left and/or right frames. Information such as scene information from left view decoding may be communicated to be used for right view decoding, for example. In addition, the decoder 204 may comprise suitable logic, circuitry, interfaces and/or code that may be operable to decode left view and/or right view video from the VTU 110 frame by frame. The decoder 204 may be operable to utilize various video decompression algorithms such as specified in MPEG-2, MPEG-4, AVC, VC1, VP6, H.264 and/or other video formats to form decompressed or decoded video content.

The graphics processor 210 may comprise suitable logic, circuitry, interfaces and/or code that may be operable to receive 2D and/or left and/or right 3D graphics information, for example, left and/or right 3D graphics primitives, from the host processor 208 and/or from the memory and playback module 216, for example, and may output left and/or right rendered 3D graphics frames. In addition, the graphics processor 210 may comprise knowledge of various capabilities of the 3D display device 114 and/or may be operable to process left and/or right 3D graphics based on capabilities of the 3D display device 114. For example, the graphics processor 210 may be operable to generate left and/or right 3D graphics for time sequential 3D display capabilities. In various exemplary embodiments of the invention, the graphics processor 210 may be operable to generate time sequential left and right 3D graphics. The graphics processor 210 may be operable to generate left and/or right 3D graphics for left and right 3D video and/or graphics streams. In various embodiments of the invention, the left and/or right 3D graphics content may overlay, be blended with and/or replace left and/or right 3D video content and/or 2D video content, for example. Moreover, exemplary left and/or right view 3D graphics may comprise a user interface, for example, a user guide and/or a menu.

The memory and playback module 216 may comprise suitable logic, circuitry, interfaces and/or code that may be operable to store information such as configuration parameters, executable instructions and/or left and/or right view 3D video and/or graphics data that may be utilized in the 3D video processing system 200. The executable instructions may comprise various image processing algorithms that may be utilized to process the left and/or right video and/or graphics content by the decoder 204. Moreover, the executable instructions may comprise graphics processing algorithms that may be utilized by the graphics processor 210 to render 2D and/or left and/or right view 3D graphics. The executable instructions and/or configuration parameters may enable formatting of the left and/or right frames and the blanking frames into one or more sequential patterns for display. Left and/or right frame 3D video and/or graphics content stored within the memory and playback module 216 may comprise input and/or output of one or more of the decoder 204, the graphics processor 210, the video and/or graphics blend module 284, the 3D formatter 232, the storage 218, the host processor 208 and/or the 3D display device 214. The memory and playback module 216 may comprise RAM, ROM, low latency nonvolatile memory such as flash memory and/or other suitable electronic data storage.

The local storage 218 may comprise suitable logic, circuitry, interfaces and/or code that may be operable to record and store content from various video applications, graphics programs and/or or 3D video and/or graphics data, for example. The local storage 218 is an optional component of the 3D video processing system 200. The local storage 218 may comprise magneto- and/or optical drives such as a hard disk. The local storage 418 may also comprise solid state memory such as flash memory and/or other suitable electronic data storage capable of recording and storing data and instructions.

The 3D video and/or graphics blend module 284 may comprise suitable logic, circuitry, interfaces and/or code that may be operable to receive and blend a left 3D video stream with 2D or left 3D graphics and/or may blend a right 3D video stream with 2D or right 3D graphics. In this regard, the 3D video and/or graphics blend module 284 may utilize one or more blending factors for the blending. A blending factor may be determined based on how opaque or transparent the graphics and/or 3D video should be. In other embodiments of the invention, the graphics content may replace video content and/or the graphics content may be displayed when display of the video content is not desired. Furthermore, the 3D video and/or graphics blend module 284 may perform noise reduction and may utilize motion compensation and/or motion adaptation techniques.

The 3D formatter 232 may comprise suitable logic, circuitry, interfaces and/or code that may be operable to receive left and/or right 3D video and/or graphics frames, for example, blended left 3D video and/or graphics and blended right 3D video and/or graphics and to format the frames into a single sequential stream. In this regard, the 3D formatter 232 may be operable to generate a temporal pattern comprising one or more left 3D video and/or graphics frames, one or more right 3D video and/or graphics frames and a plurality of contiguous blanking frames. The left 3D video and/or graphics frames may be referred to as left frames and the right 3D video and/or graphics frames may be referred to as right frames. In an exemplary embodiment of the invention, the 3D formatter may generate a pattern of left frame, left frame, left frame, blanking frame, blanking frame, right frame, right frame right frame, blanking frame, blanking frame.

The 3D display device 214 may be similar and/or substantially the same as the 3D display device 114 described with respect to FIG. 1. The 3D display device 214 may comprise a persistent type of display panel, for example, an LCD display. The 3D display device 214 may comprise suitable logic, circuitry, interfaces and/or code that may be operable to format and/or display left and/or right view 3D video and/or graphics frames and/or blanking frames in a specified sequential order or pattern. The 3D display device may be operable to synchronize left and/or right 3D video and/or graphics frames with 3D shutter glasses. For example, the 3D display device 214 may be operable to adaptively synchronize with 3D shutter glasses.

In operation, the decoder 204 may be operable to receive left and/or right view streams of 3D video and/or graphics information. The left video stream, the right video stream and/or the graphics information may be decoded by the decoder 204 and may be stored in the memory and playback module 216 and/or the storage 218. The host processor 208 may select graphics information, for example, 2D or left and/or right 3D graphics primitives, to be processed by the graphics processor 210. For example, the graphics information may be stored within the 3D video processing system 200 and/or may be received from the VTU 110 in a multiplexed transport stream and stored in the memory and playback module 216 and/or in the storage 218. The selected graphics information may be sent to the graphics processor 210 for processing and/or for rendering 2D or 3D graphics frame data.

The graphics processor 210 may be operable to generate 2D and/or left and/or right 3D graphics frame data based on the graphics information. The graphics frame data may comprise pixel data. In various exemplary embodiments of the invention, the graphics processor 210 may be operable to generate graphics frame data for time sequential display of left, right and/or blanking frames in a specified temporal pattern. The video and/or graphics blend module 284 may receive left and/or right 3D video and 2D or left and/or right 3D graphics frame data and may blend the left video frame data with the graphics data, for example, left 3D graphics frame data or 2D graphics frame data and similarly blend the right 3D video frame data with 2D or right 3D graphics frame data. Furthermore, the video and/or graphics blend module 284 may be operable to perform noise reduction. The video and/or graphics blend module 284 may output streams of frames comprising blended left video and graphics data that may be referred to as left streams or left frames and may output streams of frames comprising blended right video and graphics data that may be referred to as right streams or right frames.

The 3D formatter 232 may be operable to receive the blended left and/or the blended right streams and may be operable to format the frames in a specified pattern comprising left, right and blanking frames. The 3D formatter 232 may be operable to output the formatted left, right and blanking frames to the 3D display device 214. The 3D display device 214 may sequentially display the left, right and blanking in the specified temporal pattern. Viewers of the 3D display device 214 may wear 3D shutter glasses that may synchronize transfer and blockage of light through the left lens and the right lens with the left, right and blanking frames that are sequentially displayed. For example, a left eye may be blocked from viewing right 3D video and/or graphics content and the right eye may be blocked from viewing left 3D video and/or graphics content. The left, right and blanking temporal pattern may comprise two or more contiguous blanking frames between left and right frames. The two or more contiguous blanking frames may enable a viewer to see stereoscopic left and right views of the 3D video and/or graphics content without perceiving left and right frame cross talk. In various embodiments of the invention, the 3D display device 214 may be adaptively synchronized with the 3D shutter glasses.

Figure 3:
FIG. 3 is a block diagram that illustrates exemplary left view and right view 3D video and/or graphics frames, in accordance with an embodiment of the invention.

FIG. 3 is a block diagram that illustrates exemplary left view and right view 3D video and/or graphics frames, in accordance with an embodiment of the invention. Referring to FIG. 3, there is shown a left view 3D video and/or graphics frame 310 and a right view 3D video and/or graphics frame 312.

The left view 3D video and/or graphics frame 310 and/or the right view 3D video and/or graphics frame 312 may comprise 3D video and 2D or 3D graphics that may be generated by the graphics processor 210 and blended by the video and/or graphics blend module 284. The left view 3D video and/or graphics frame 310 may comprise graphics content as seen from a stereoscopic left point of view and the right view 3D video and/or graphics frame 312 may comprise graphics content as seen from a stereoscopic right point of view. In this regard, an angle of view of an object located in the left view 3D video and/or graphics frame 310 may be different than an angle of view of the same object located in the right view 3D video and/or graphics frame 312. Moreover, at least a portion of background imagery that may be occluded by an object in the left view 3D video and/or graphics frame 310 may be viewable in the right view 3D video and/or graphics frame 312 and vice versa, due to the different viewing angles in the two frames 310 and 312.

In various embodiments of the invention, the left view 3D video and/or graphics frame 310 and the right view 3D video and/or graphics frame 312 may comprise two points of view occurring simultaneously, however, the invention is not so limited. For example, depending on how the two views 310 and 312 are displayed in time, the instant in time represented by the left view 3D video and/or graphics frame 310 may be somewhat different than the instant in time represented by the right view 3D video and/or graphics frame 312. In this regard, the different time instants represented by the left and right views 310 and 312 may correspond to the rate at which the two views are displayed by the 3D display device 214, for example.

The left view 3D video and/or graphics frame 310 may be referred to as a left frame and the right view 3D video and/or graphics frame 312 may be referred to as a right frame.

FIG. 4A is a block diagram that illustrates an exemplary sequence of 3D frames in a left, black, right, black pattern, which may be utilized in connection with an embodiment of the invention. Referring to FIG. 4, there is shown a time line 400A comprising a left, black, right, black sequential frame display pattern.

The timeline 400A represents writing lines of pixel data for left frames, right frames and black frames to a persistent display device, for example, the 3D display device 214 which may comprise an LCD display device. The 3D display device 214 may be referred to as the display 214. The left and right frames may comprise left and right 3D video and/or graphics content respectively. The black frames may comprise blanking frames, for example, black or low illumination pixels or single or multiple tone levels. Moreover, in various embodiments of the invention, the black frames may comprise pixels of muted illumination that may comprise video and/or graphics content. The black frames may enable shutter glasses to synchronize with display of left and right frames. For example, the 3D display device 214 may be operable to adaptively synchronize with 3D shutter glasses.

In operation, between time instants T0 and T1, lines of a left frame comprising 3D video and/or graphics content may be written to an LCD display, for example, to a display panel of the display 214. At time instant T1, the display 214 may be illuminated with the left frame lines and the pixels may remain illuminated until they are written over with different illumination values. Also between time instants T1 and T2, lines of black frame pixel data may be written to the LCD display 214. As the black lines are written, the left lines that have not yet been written over may remain illuminated. At time instant T2, the screen has been written to with black frame pixel data, however, due to liquid crystal response time relative to the refresh rate of the left, right and black frames, pixels that are written with black frame values, may still retain some level of vestige illumination from the left frame pixel data that was written between time instants T0 and T1. The vestige left frame illumination may remain on the LCD screen until the liquid crystal response time has lapsed. Between time instants T2 and T3, the right frame lines are written to the LCD screen. As the right frame lines are written to the screen, a portion of the screen may still be illuminated with the vestige left frame illumination where the liquid crystal response time has not lapsed and the pixel illumination has not yet reached the specified level for the black illumination. In this regard, a viewer utilizing shutter glasses where the shutter glasses are open for the right eye during the time interval from time instant T2 to time instant T3 may experience crosstalk from the vestigial left frame pixel illumination that was written during the interval between time instants T0 to T1.

FIG. 4B is a block diagram that illustrates an exemplary sequence of 3D frames comprising persistent pixel illumination, in a left, left, black, black, right, right, black, black pattern, in accordance with an embodiment of the invention. Referring to FIG. 4B, there is shown a time line 400B comprising a left, left, black, black, right, right, black, black sequential frame display pattern.

In various embodiments of the invention, the timeline 400B may represent writing of lines of pixel data for left frames, right frames and black frames to a persistent display device, for example, to the 3D display device 214 which may comprise an LCD display device. The left, right and/or black frames may be written to the persistent display device 214 in a specified pattern, for example, a left frame, left frame, black frame, black frame, right frame, right frame, black frame, black frame pattern comprising at least two contiguous black frames that may enable mitigation of vestige illumination cross talk. The left and right frames may comprise left and right 3D video and/or graphics content respectively. The black frames may comprise blanking frames, for example, black or low illumination pixels of single or multiple tone levels. Moreover, in various embodiments of the invention, the black frames may comprise pixels of muted illumination that may comprise video and/or graphics content. The black frames may enable 3D shutter glasses to synchronize with display of left and right frames. In various embodiments of the invention, the black frames may enable adaptive synchronization with the 3D shutter glasses.

In operation, between time instants T0 and T1, lines of a left frame comprising 3D video and/or graphics content may be written to an LCD display, for example, to a display panel of the display device 214. At time instant T1, the display 214 may be illuminated with the left frame lines and the pixels may remain illuminated until they are written over with different illumination values. For example, between time instants T1 and T2, the screen may be illuminated at the same levels as were written between times instants T0 and T1. Between the time instants T2 and T3, lines of black frame pixel data may be written to the LCD display 214. As the black lines are written, the left lines that have not yet been written over may remain illuminated.

At time instant T3, the screen has been written to with black frame pixel data, however, due to liquid crystal response time relative to the refresh rate of the left, right and black frames, pixels that are written with black frame values, may still retain some level of vestige illumination from the left frame pixel data that was written between time instants T0 and T1. Between time instants T3 and T4, the liquid crystal response time may lapse which may enable the black frame pixel values to clear the screen of vestige left frame illumination levels. In this manner, between the time instants T0 and T4, the left lens of a viewers shutter glasses may be open for transmission of display illumination to a viewers left eye and a corresponding right lens shutter may block light from the display 214 to the viewer's right eye. Similarly, between time instants T4 and T5, the right frame lines are written to the LCD screen. As the right frame lines are written to the screen, a portion of the screen may still be illuminated at the black frame level.

At time instant T5, the display 214 may be illuminated with the right frame lines and the pixels may remain illuminated until they are written over with different illumination values. For example, between time instants T5 and T6, the screen may be illuminated at the same levels as were written between time instants T4 and T5. Between the time instants T6 and T7, lines of black frame pixel data may be written to the LCD display 214. As the black lines are written, the right lines that have not yet been written over may remain illuminated. At time instant T7, the screen has been written to with black frame pixel data, however, due to liquid crystal response time relative to the refresh rate of the left, right and black frames, pixels that are written with black frame values, may still retain some level of vestige illumination from the right frame pixel data that was written between time T4 and T5. Between time instants T7 and T8, the liquid crystal response time may lapse which may enable the black frame pixel values to clear the screen of vestige right frame illumination levels. In this manner, between the time instants T4 and T8, the right lens of a viewers shutter glasses may be open for transmitting display illumination to the viewer's right eye and the corresponding left lens shutter may block light from the display 214 to the viewer's left eye. In this manner, crosstalk due to vestigial left and/or right frame illumination may be mitigated.

Figure 5:
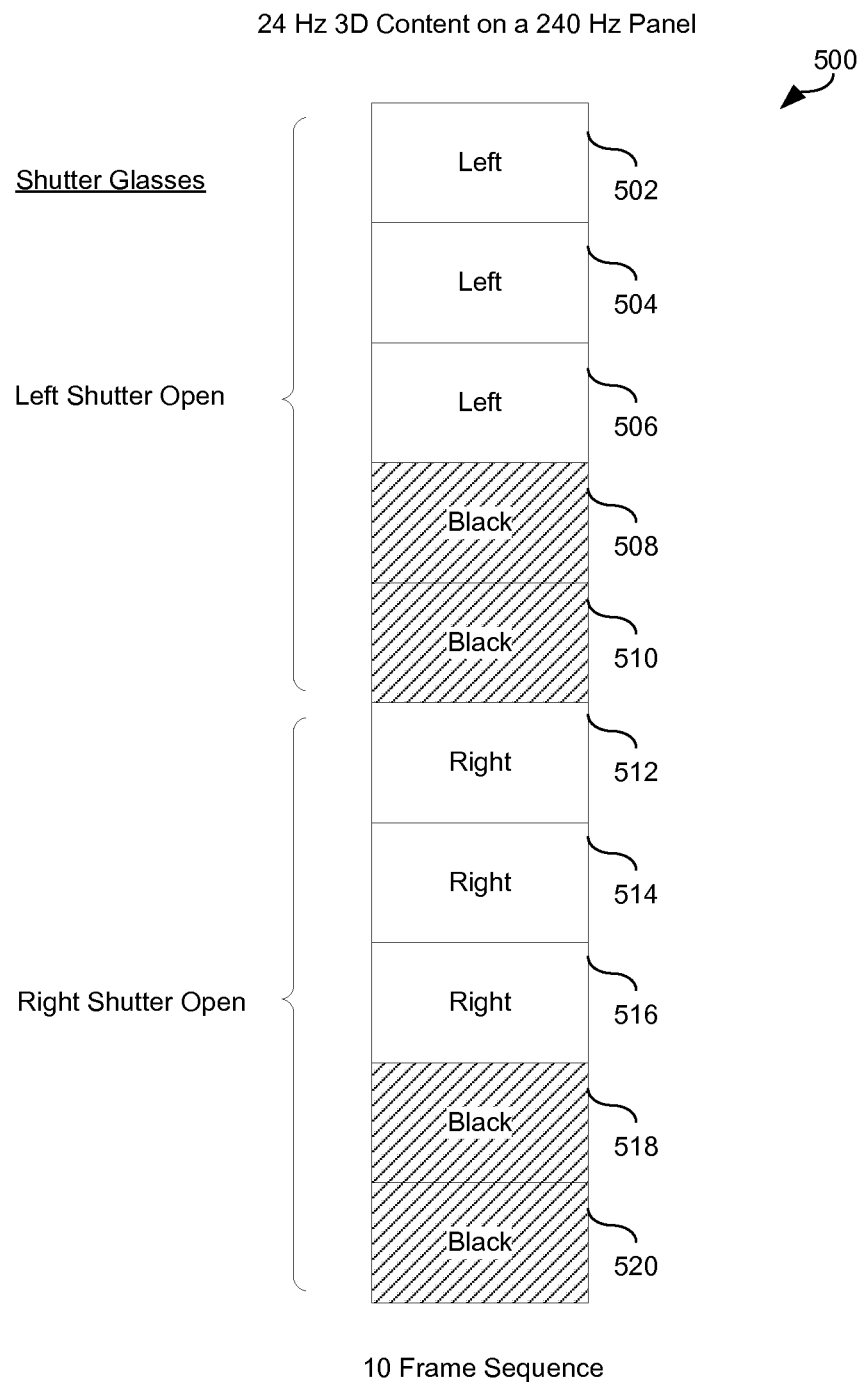
FIG. 5 is a block diagram that illustrates an exemplary sequence of 3D left, right and black frames that may be utilized when displaying 24 Hz 3D content on a 240 Hz display panel, in accordance with an embodiment of the invention.

FIG. 5 is a block diagram that illustrates an exemplary sequence of 3D left, right and black frames that may be utilized when displaying 24 Hz 3D content on a 240 Hz display panel, in accordance with an embodiment of the invention. Referring to FIG. 5, there is shown a sequence of ten frames 500 comprising 3D video and/or graphics left frames 502, 504 and 506, 3D video and/or graphics right frames 512, 514 and 516 and black frames 508, 510, 518 and 520.

In operation, the left frames 502, 504 and 506 and the right frames 512, 514 and 516 may comprise 24 Hz 3D video and/or graphics content for example, the left frames 502, 504 and 506 and the right frames 512, 514 and 516 may comprise video and/or graphics content from a pair of corresponding left view and right view stereoscopic 3D frames wherein each pair of 3D frames may be captured at a rate of 24 Hz. In various embodiments of the invention, the left frames 502, 504 and 506 may comprise the same video and/or graphics content and the right frames 512, 514 and 516 may comprise the same video and/or graphics content. The specified pattern shown in the sequence of ten frames 500 may comprise one 24 Hz pair of corresponding left and right content, which may be displayed at a frame rate of 240 Hz. In this regard, the left frames may be written to the display 214 in a similar manner as the frames shown in FIG. 4B.

The left frame content may be written to the display 214 in one 240 Hz cycle and may be persistently illuminated on the display 214 until the black frame 508 is written to the display 214. The black frame pixel illumination may be written to the display 214 in one 240 Hz cycle and may be persistently displayed over another 240 Hz cycles during the black frame 508 and 510. In this manner, vestige illumination in the LCD display 214 from the left frame pixel data may fade or convert to the illumination level specified for the black frames. In this regard, a viewer's shutter glasses may enable transmittance of light to the left eye during cycles of the left frames 502, 504 and/or 506 and/or for cycles of the black frames 508 and 510. Similarly, the right frame content may be written to the display 214 in one 240 Hz cycle and may be persistently illuminated on the display 214 until lines of the black frame 518 are written to the display 214.

The black frame pixel illumination may be written over one 240 Hz cycle and may persist over another 240 Hz cycle during the black frames 518 and 520. In this manner, vestige illumination in the LCD display 214 from the right frame pixel data may fade or convert to the illumination level specified for the black frames. In this regard, a viewer's shutter glasses may enable transmittance of light to the right eye during cycles of the right frames 512, 514 and/or 516 and/or for cycles of the black frames 518 and 520. Crosstalk between left and right frames may be mitigated due to repetition of contiguous black frames.

Figure 6:
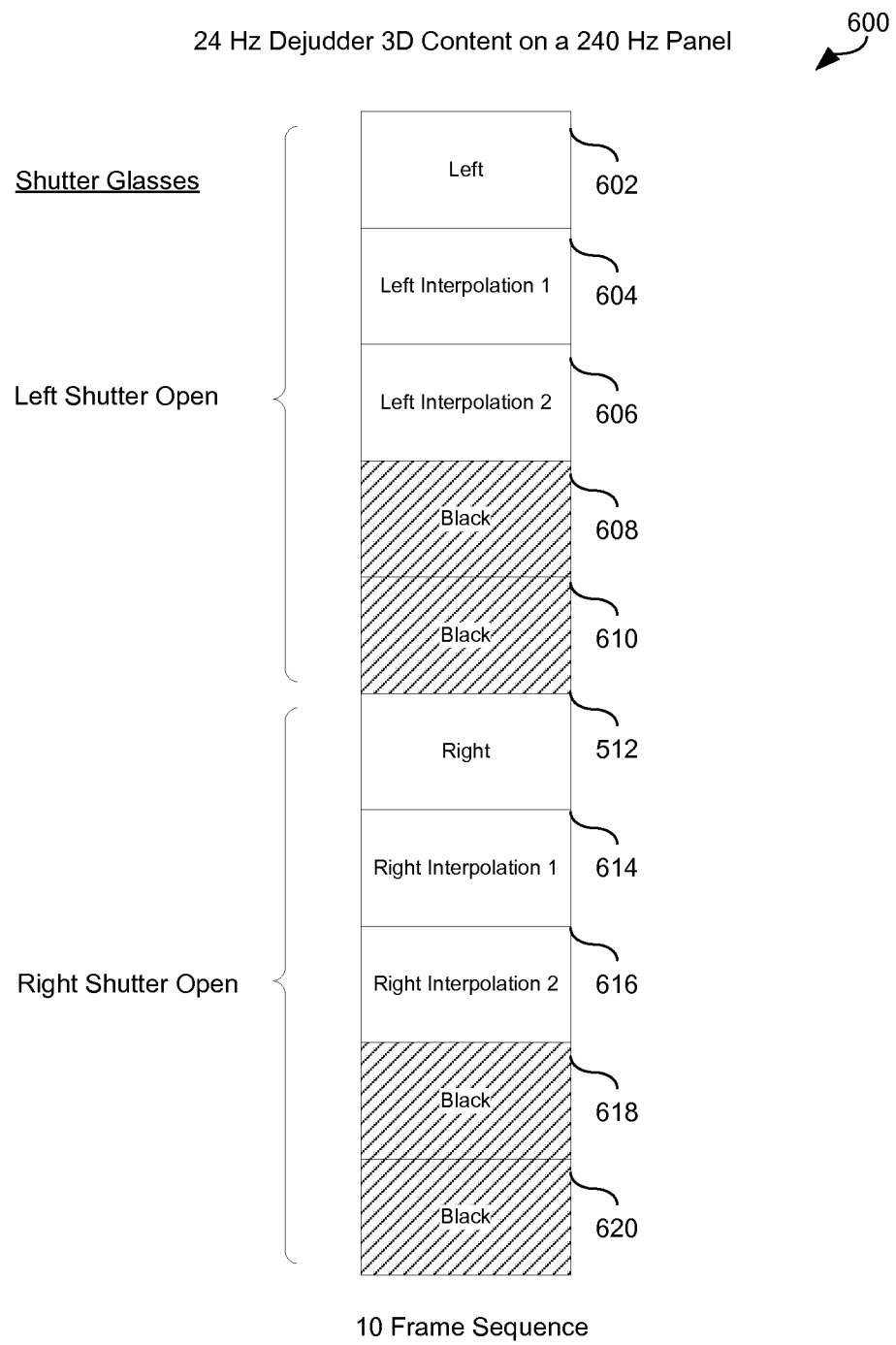
FIG. 6 is a block diagram that illustrates an exemplary sequence of 3D left, right and black frames that may be utilized when displaying 24 Hz de-judder 3D content on a 240 Hz display panel, in accordance with an embodiment of the invention.

FIG. 6 is a block diagram that illustrates an exemplary sequence of 3D left, right and black frames that may be utilized when displaying 24 Hz de-judder 3D content on a 240 Hz display panel, in accordance with an embodiment of the invention. Referring to FIG. 6, there is shown an exemplary sequence of ten frames 600 comprising 3D video and/or graphics left frame 602, left interpolated frame 604 and left interpolated frame 606, 3D video and/or graphics right frame 612, right interpolated frame 614 and right interpolated frame 616 and black frames 608, 610, 618 and 620.

In operation, the left frame 602, left interpolated frame 604 and left interpolated frame 606 and the right frame 612, right interpolated frame 614 and right interpolated frame 616 may comprise 24 Hz 3D video and/or graphics content. The left frames 602, 604 and 606 and the right frames 612, 614 and 616 may comprise video and/or graphics content from a pair of corresponding left view and right view stereoscopic 3D frames wherein each pair of 3D frames may be captured at a rate of 24 Hz. In various embodiments of the invention, the left interpolated frame 604 may comprise content interpolated from the left frame 602 and/or one or more other left or right frames. Furthermore, the left interpolated frame 606 may comprise content interpolated from frame 602 and/or one or more other left and/or right frames. In this regard, content in the left frame 602 and/or the left interpolated frames 604 and/or 606 may comprise imagery that has undergone motion. For example, motion adaptation and/or motion compensation techniques may be utilized to interpolate the frames 604 and/or 606. In this manner, motion judder that may be perceived by a viewer when frames are repeated over time, may be reduced or mitigated by inserting the interpolated left frames 604 and 606. Similarly, the right frames may comprise a right frame 612, a right interpolated frame 614 and/or a right interpolated frame 616. The utilization of the interpolated frames 614 and 616 may reduce and/or mitigate motion judder.

The specified pattern shown in the exemplary sequence of ten frames 600, which may be generated based on a pair of 24 Hz corresponding left and right frames, may be displayed at a frame rate of 240 Hz. In this regard, the left frames may be written to the display 214 in a similar manner as the frames shown in FIG. 4B. The left frame 602 may be written to the display 214 in one 240 Hz cycle followed by the left interpolated frame 604 that may be written to the display 214 in a second 240 Hz cycle and the left interpolated frame 606 may subsequently be written to the display 214 in a third 240 Hz cycle. The left interpolated frame 606 may be persistently illuminated on the display 214 until the black frame 608 is written to the display 214.

The black frame 608 pixel illumination may be written to the display 214 in one 240 Hz cycle and may be persistently displayed over another 240 Hz cycles during the black frame 608 and 610. In this manner, vestige illumination in the LCD display 214 from the left interpolated frame 606 pixel data may fade or be converted to the illumination level specified for the black frames. In this regard, a viewer's shutter glasses may enable transfer of light to the viewer's left eye during cycles of the left frame 602, the left interpolated frame 604 and/or the left interpolated frame 606 and/or for cycles of the black frames 608 and 610. Similarly, the right frame 612, the right interpolated frame 614, the right interpolated frame 616 and the two black frames 618 and 620 may be sequentially written to the display 214 over five 240 Hz cycles. In this regard, the viewer's shutter glasses may enable transfer of light to the right eye during cycles of the right frame 612, the right interpolated frame 614, the right interpolated frame 616 and the two black frames 618 and 620. Crosstalk between left and right frames may be mitigated due to repetition of contiguous black frames.

Figure 7:
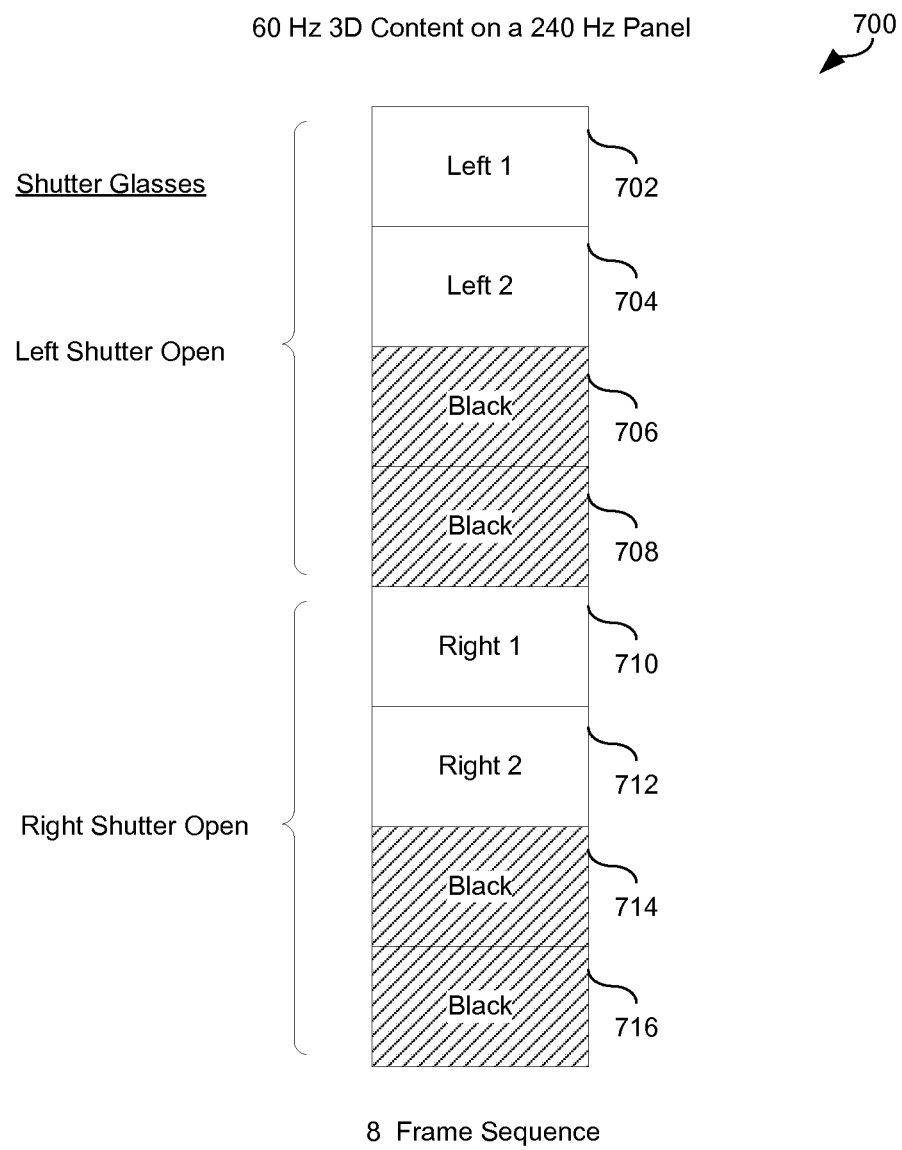
FIG. 7 is a block diagram that illustrates an exemplary sequence of 3D left, right and black frames that may be utilized when displaying 60 Hz 3D content on a 240 Hz display panel, in accordance with an embodiment of the invention.

FIG. 7 is a block diagram that illustrates an exemplary sequence of 3D left, right and black frames that may be utilized when displaying 60 Hz 3D content on a 240 Hz display panel, in accordance with an embodiment of the invention. Referring to FIG. 7, there is shown a sequence of eight frames 700 comprising left frames 702 and 704, right frames 710 and 712 that may comprise 3D video and/or graphics content. Also, there is shown black frames 706, 708, 714 and 716.

In operation, the left frames 702 and 704, right frames 710 and 712 may comprise 60 Hz 3D video and/or graphics content, for example, the left frame 702 and the right frame 710 may comprise video and/or graphics content from a pair of corresponding left view and right view stereoscopic 3D frames wherein each pair of 3D frames may be captured at a rate of 60 Hz. Moreover, the left frame 704 and the right frame 712 may comprise a pair of corresponding left view and right view frames captured at 60 Hz. The specified pattern shown in the sequence of eight frames 700 that may comprise two pairs of 60 Hz corresponding left and right 3D content may be displayed at a frame rate of 240 Hz. In this regard, the left frames may be written to the display 214 in a similar manner as the frames shown in FIG. 4B.

The left frame 702 may be written to the display 214 in one 240 Hz cycle and the left frame 704 may be written during a second 240 Hz cycle. The left frame 704 may be persistently illuminated on the display 214 until the black frame 706 is written to the display 214. The black frame pixel illumination may be written to the display 214 in one 240 Hz cycle and may be persistently displayed over another 240 Hz cycles during the black frame 708. In this manner, vestige illumination in the LCD display 214 from the left frame 704 pixel data may fade or convert to the illumination level specified for the black frames. In this regard, a viewer's shutter glasses may enable transmittance of light to the left eye during cycles of the left frames 702 and 704 and/or for cycles of the black frames 706 and 708.

Similarly, the right frame 710 content may be written to the display 214 in one 240 Hz cycle followed by the right frame 712 that may be persistently illuminated on the display 214 until lines of the black frame 714 are written to the display 214. The black frame 714 pixel illumination may be written over one 240 Hz cycle and may persist over another 240 Hz cycle during the black frame 716. In this manner, vestige illumination in the LCD display 214 from the right frame 712 pixel data may fade or be converted to the illumination level specified for the black frames. In this regard, a viewer's shutter glasses may enable transmittance of light to the right eye during cycles of the right frames 710 and 712 and/or during cycles of the black frames 714 and 716. In this manner, crosstalk between left and right frames may be mitigated due to repetition of contiguous black frames.

Figure 8:
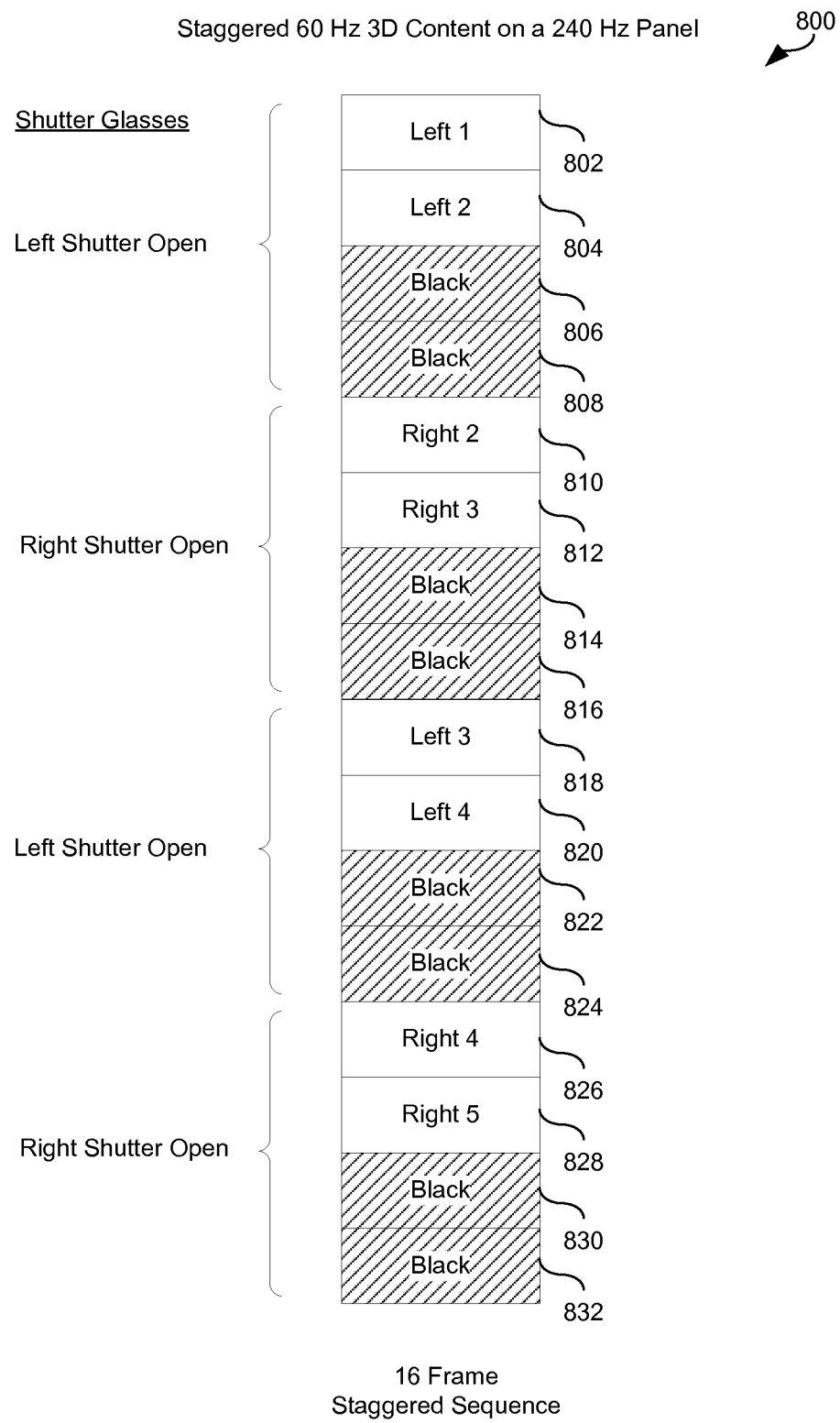
FIG. 8 is a block diagram that illustrates an exemplary sequence of staggered 3D left, right and black frames that may be utilized when displaying 60 Hz 3D content on a 240 Hz display panel, in accordance with an embodiment of the invention.

FIG. 8 is a block diagram that illustrates an exemplary sequence of staggered 3D left, right and black frames that may be utilized when displaying 60 Hz 3D content on a 240 Hz display panel, in accordance with an embodiment of the invention. Referring to FIG. 8, there is shown a sequence of sixteen frames 800 comprising left frames 802 and 804, 818 and 820, right frames 810, 812, 826 and 828 that may comprise 3D video and/or graphics content. Also, there is shown black frames 806, 808, 814, 816, 822, 824, 830 and 832.

In operation, the left frames 802 and 804, 818 and 820 and the right frames 810, 812, 826 and 828 may comprise 60 Hz 3D video and/or graphics content, for example, the left frame 804 and the right frame 810 may comprise video and/or graphics content from a pair of corresponding left view and right view stereoscopic 3D frames, wherein each pair of 3D frames may be captured at rate of 60 Hz. Similarly, the right frame 812 and the left frame 818 may comprise a pair and the left frame 820 and the right frame 826 may comprise a pair. A right frame corresponding the left frame 802 may be written to the display 214 prior to the sequence of the sixteen frames 800. Also, a left frame corresponding to the right frame 828 may be written to the display 214 subsequent to the sequence of the sixteen frames 800. In this regard, corresponding 3D left and right frames are staggered such that the left and right frames are not displayed out of sequence. For example, in the frame sequence 700 described with respect to FIG. 7, the left frame 702 and the right frame 710 may comprise a pair of corresponding 3D left and right frames and the left frame 704 and the right frame 712 may comprise a subsequent pair of 3D left and right frames. As shown in FIG. 7, the left frame 704 from the second pair is displayed prior to the right frame 710 of the first pair. In this regard, the sequence of the sixteen frames 800 is written to the display 214 in an ascending sequence. In this manner, visual artifacts that may be perceived by a viewer when left and right frames are displayed out of sequence may be mitigated. Moreover, by inserting two black frames between left and right frames, for example, the black frames 806 and 808 that may be written to the display 214 between the left frame 804 and the right frame 810, left and right frame crosstalk may be mitigated.

Figure 9:
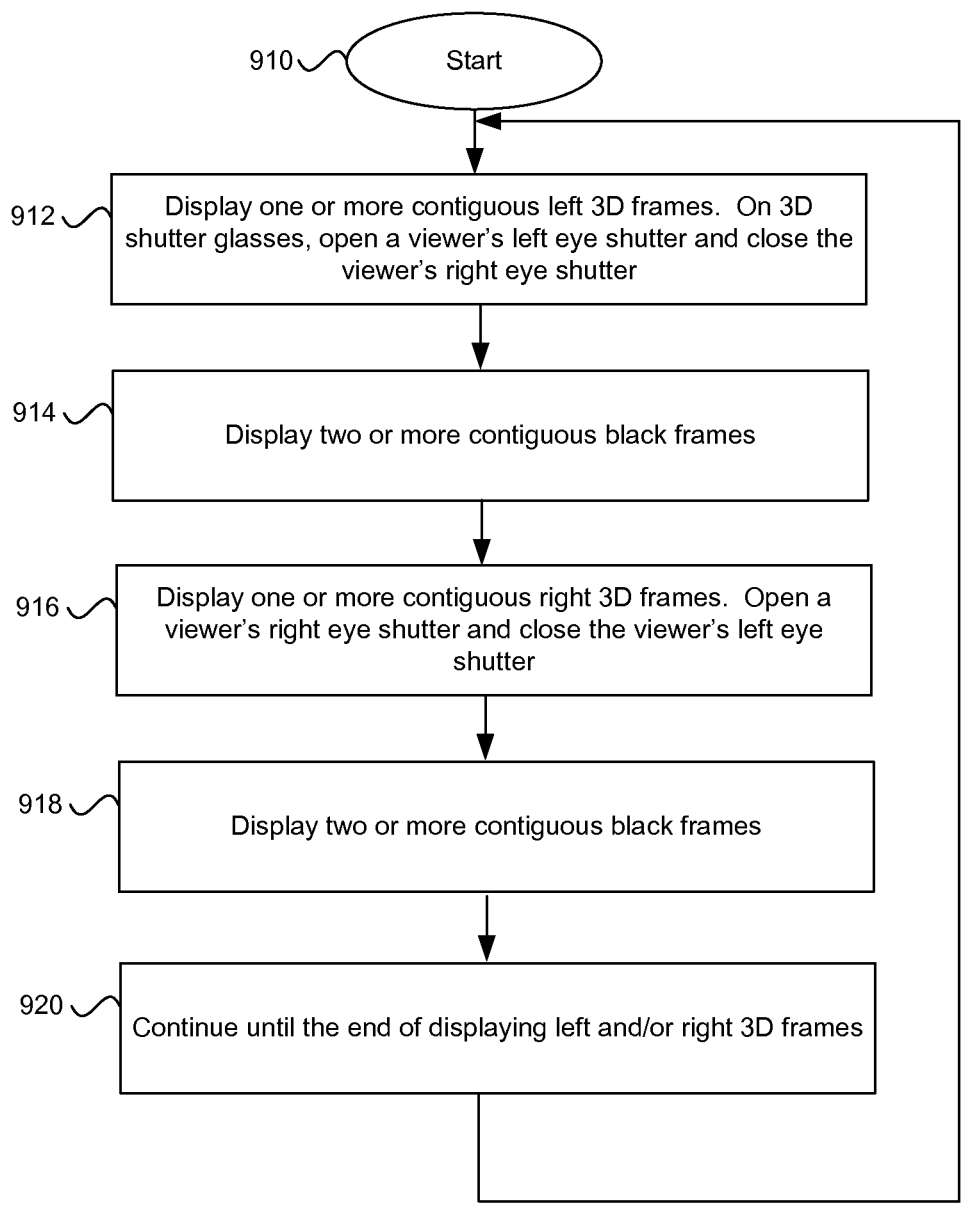
FIG. 9 is a flow chart illustrating exemplary steps for response time compensation for left and right view 3D video and/or graphics frames, in accordance with an embodiment of the invention.

FIG. 9 is a flow chart illustrating exemplary steps for response time compensation for left and right view 3D video and/or graphics frames, in accordance with an embodiment of the invention.

The exemplary steps may begin with step 910. In step 912, one or more contiguous left 3D frames, for example, the left frames 802 and 804 may be displayed by the 3D display device 214. 3D shutter glasses that may be synchronized with the sequence of frames may open the left shutter and close the right shutter. In this regard, the 3D display device 214 may be adaptively synchronized with 3D shutter glasses. In step 914, two or more contiguous black frames, for example, the black frames 806 and 808 may be displayed by the 3D display device 214. In step 916, one or more contiguous right 3D frames, for example, the right frames 810 and 812 may be displayed by the 3D display device 214. The 3D shutter glasses may close the left shutter and open the right shutter. In step 918, two or more contiguous black frames, for example, the black frames 814 and 816 may be displayed by the 3D display device 214. In step 920, the exemplary steps may proceed to step 912 until the end of displaying the left and right 3D frames.

In an embodiment of the invention, one or more processors and/or circuits in a 3D video and/or graphics processing device, for example, the 3D formatter 232 shown in the 3D video processing system 200, may generate formatted left view 3D video and/or graphics frames, right view 3D video and/or graphics frames and black frames in a specified sequential pattern, for example, the sequence of ten frames 500, the sequence of ten frames 600, the sequence of eight frames 700 and/or the sequence of sixteen frames 800. The specified sequential pattern may comprise at least two black frames inserted between the at least one left view 3D video and/or graphics frames and the at least one right view 3D video and/or graphics frames as shown in FIG. 4B, FIG. 5, FIG. 6, FIG. 7 and FIG. 8. The formatted left view 3D video and/or graphics frames, the right view 3D video and/or graphics frames and the at least two contiguous black frames may be displayed in order according to the specified sequential pattern on an LCD display device, for example, on the 3D display device 214.

The specified sequential pattern may comprise two or three contiguous the left frames followed by at least two contiguous black frames followed by two or three contiguous right frames followed by at least two contiguous black frames, for example, as described with respect to the sequence of ten frames 500, the sequence of ten frames 600, the sequence of eight frames 700 and/or the sequence of sixteen frames 800. One or more of the at least one left view 3D video and/or graphics frames may comprise one or more interpolated left view 3D video and/or graphics frames, for example, as described with respect to the sequence of ten frames 600. Also, the at least one right view 3D video and/or graphics frames may comprise one or more interpolated right view 3D video and/or graphics frames, for example, as described with respect to the sequence of ten frames 600.

The at least one left view 3D video and/or graphics frames and the at least one right view 3D video and/or graphics frames may be displayed in an order that is not descending, for example, as described with respect to the sequence of sixteen frames 800. Moreover, the at least two contiguous black frames of the specified sequential pattern may be displayed for a duration that exceeds liquid crystal display response time, for example, as described with respect to FIG. 4B. A viewer's 3D shutter glasses may be operable to adaptively synchronize with the specified sequential pattern based on the two or more contiguous black frames within the specified sequential pattern, for example the frames 508, 510, 518 and 520 shown in FIG. 5.

A left lens of a viewer's 3D shutter glasses may transmit light within an interval of display of the at least one left view 3D video and/or graphics frames followed by the at least two black frames and prior to display of the at least one right view 3D video and/or graphics frames, for example, during the interval between time instants T0 and T4 shown in FIG. 4B. The right lens of the 3D shutter glasses may block light during the interval that the left lens is transmitting light. Similarly, a right lens of the 3D shutter glasses may transmit light within an interval of display of the at least one right view 3D video and/or graphics frames followed by the at least two black frames and prior to display of the at least one left view 3D video and/or graphics frames, for example, within the interval between time instants T4 and T8 shown in FIG. 4B. The left lens of the 3D shutter glasses may block light during the interval that the left lens is transmitting light. The specified sequential pattern comprising content from a pair of left and right 3D 24 Hz frames may be displayed on a 240 Hz display device as described with respect to FIG. 5 and FIG. 6. Additionally, the specified sequential pattern comprising content from two pairs of left and right 3D 60 Hz frames may be displayed on a 240 Hz display device as described with respect to FIG. 7 and FIG. 8. In this manner, crosstalk comprising left and right 3D content may be mitigated.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for response time compensation for 3D video processing.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system, comprising: circuitry configured to: receiving an interleaved multi-view video stream comprising at least one left view frame, at least one second right view frame, and a plurality of blanking frames in a sequential pattern, the plurality of blanking frames separating the at least one first left view frame from the at least one second right view frame in the sequential pattern and providing an indication of a transition between the at least one left view frame and the at least one right view frame within the sequential pattern; detecting the plurality of blanking frames within the sequential pattern in the interleaved multi-view video stream; and synchronizing operation of a viewing device based at least in part on the plurality of blanking frames being detected within the sequential pattern, the step of synchronizing operation of the viewing device comprising determining whether a current frame is a left view frame or a right view frame based at least in part on the sequential pattern and the detected plurality of blanking frames.

2. The system of claim 1, wherein the viewing device corresponds to a pair of shutter glasses.

3. The system of claim 2, wherein a first lens of the pair of shutter glasses allows light to pass through during an interval of display of the at least one left view frame followed by the plurality of blanking frames and prior to display of the at least one right view frame during which interval a second lens of the pair of shutter glasses blocks light.

4. The system of claim 1, wherein synchronizing operation of the viewing device further comprises communicating with the viewing device via a wireless protocol.

5. The system of claim 1, wherein the plurality of blanking frames inserted between the at least one left view frame and the at least one right view frame within the sequential pattern provide a time interval to mitigate the vestige illumination cross talk between the at least one left view frame and the at least one right view frame.

6. A system, comprising:
circuitry configured to:
receive an interleaved multi-view video stream comprising at least one left view frame, at least one right view frame, and a plurality of blanking frames in a sequential pattern, wherein the plurality of blanking frames separate the at least one left view frame from the at least one right view frame in the sequential pattern and provide an indication of a transition between the at least one left view frame and the at least one right view frame within the sequential pattern, wherein the plurality of blanking frames further provide a time interval to mitigate a vestige illumination cross talk between the at least one left view frame and the at least one right view frame; and
display the interleaved multi-view video stream in the sequential pattern.

7. The system of claim 6, wherein the circuitry is further capable of:
receiving the at least one left view frame and the at least one right view frame;
generating the plurality of blanking frames; and
generating the interleaved multi-view video stream by interleaving the at least one left view frame and the at least one right view frame and inserting the plurality of blanking frames.

8. The system of claim 6, wherein the interleaved multi-view video stream corresponds to a three-dimensional (3D) video stream.

9. The system of claim 6, wherein the interleaved multi-view video stream further comprises another plurality of blanking frames immediately after the at least one right view frame in the sequential pattern.

10. The system of claim 6, wherein at least one of the plurality of blanking frames comprises pixels of muted illumination.

11. The system of claim 6, wherein the circuitry is configured to display the plurality of blanking frames for a duration that exceeds a display response time.

12. The system of claim 6, wherein the at least one left view frame comprises at least one interpolated left view frame, or the at least one right view frame comprises at least one interpolated right view frame.

13. A method, comprising:
receiving, by circuitry, an interleaved multi-view video stream comprising at least one left view frame, at least one right view frame, and a plurality of blanking frames in a sequential pattern, the plurality of blanking frames separating the at least one left view frame from the at least one right view frame in the sequential pattern and providing an indication of a transition between the at least one left view frame and the at least one right view frame within the sequential pattern; and displaying, by the circuitry, the interleaved multi-view video stream in the sequential pattern.

14. The system of claim 13, wherein the plurality of blanking frames inserted between the at least one left view frame and the at least one right view frame within the sequential pattern provide a time interval to mitigate a vestige illumination cross talk between the at least one left view frame and the at least one right view frame.

15. The method of claim 13, further comprising:

receiving, by the circuitry, the at least one left view frame and the at least one right view frame;

generating, by the circuitry, the plurality of blanking frames; and generating, by the circuitry, the interleaved multi-view video stream by interleaving the at least one left view frame and the at least one right view frame and inserting the plurality of blanking frames.

16. The method of claim 13, further comprising synchronizing operation of a viewing device based at least in part on the plurality of blanking frames.

17. The method of claim 16, further comprising communicating with the viewing device via a wireless network to synchronize the operation of the viewing device.

18. The method of claim 13, wherein at least one of the plurality of blanking frames comprises pixels of muted illumination.

19. The method of claim 13, further comprising displaying the plurality of blanking frames for a duration that exceeds a display response time.

20. The method of claim 13, wherein the at least one left view frame comprises at least one interpolated left view frame, or the at least one right view frame comprises at least one interpolated right view frame.

* * * * *